US007028995B2

(12) United States Patent
Weiland et al.

(10) Patent No.: US 7,028,995 B2
(45) Date of Patent: Apr. 18, 2006

(54) VAPOR-LIQUID CONTACT TRAYS AND METHOD EMPLOYING SAME

(75) Inventors: Ralph H. Weiland, Coalgate, OK (US); Charles A. Griesel, Red Oak, TX (US); Michael R. Resetarits, Depew, NY (US); Johnny B. Riter, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 10/632,001

(22) Filed: Jul. 28, 2003

(65) Prior Publication Data

US 2004/0080059 A1 Apr. 29, 2004

Related U.S. Application Data

(60) Provisional application No. 60/399,354, filed on Jul. 29, 2002.

(51) Int. Cl.
*B01F 3/04* (2006.01)

(52) U.S. Cl. ............................ 261/114.1; 261/114.5
(58) Field of Classification Search ............ 261/79.2, 261/114.1, 114.2, 114.3, 114.4, 114.5
See application file for complete search history.

(56) References Cited

U.S. PATENT DOCUMENTS

| | | | |
|---|---|---|---|
| 2,457,667 A * | 12/1948 | Harmon | 261/113 |
| 3,022,054 A * | 2/1962 | Kotzebue | 261/114.4 |
| 3,045,989 A | 7/1962 | Kittel | |
| 3,105,105 A * | 9/1963 | Kittel | 261/79.2 |
| 3,338,566 A * | 8/1967 | Kittel | 261/113 |
| 4,129,626 A * | 12/1978 | Mellbom | 261/114.3 |
| 4,238,426 A | 12/1980 | Slobodyanik | |
| 4,404,086 A * | 9/1983 | Oltrogge | 208/408 |
| 5,798,086 A * | 8/1998 | Erickson | 422/211 |
| 6,224,833 B1 | 5/2001 | Rall et al. | |
| 6,736,378 B1 * | 5/2004 | Colic et al. | 261/114.1 |

* cited by examiner

*Primary Examiner*—Scott Bushey
(74) *Attorney, Agent, or Firm*—James H. Marsh, Jr.; Stinson Morrison Hecker LLP

(57) ABSTRACT

A mass transfer column (20) is provided with an external shell defining an open internal region. Centrifugal contact trays (26) and return contact trays (28) are positioned in an alternating and vertically spaced apart relationship within the open internal region. Each contact tray has a plurality of vapor passages (33) for allowing vapor to flow upwardly through the tray deck to interact with liquid on the surface of the tray deck. At least one center downcomer (40) extends downwardly at an opening in the return tray deck and has a lower discharge outlet spaced above the centrifugal tray deck for feeding liquid onto the centrifugal tray deck. A rotation-inducing element may be placed within the center downcomer (40) to induce a rotational motion in liquid exiting the center downcomer (40). At least one annular downcomer (36) extends downwardly the periphery of the centrifugal tray deck and has a lower discharge outlet spaced about the return tray deck for feeding liquid onto the return tray deck. At least one of the centrifugal contact trays is positioned a greater distance above an adjacent return contact tray than the distance at least one of the return contact trays is positioned above an adjacent centrifugal contact tray. The mass transfer column (20) may further include a single support ring (64), one or more baffles (68) or combinations thereof.

23 Claims, 5 Drawing Sheets

VAPOR-LIQUID CONTACT TRAYS AND METHOD EMPLOYING SAME

CROSS REFERENCE TO RELATED APPLICATIONS

This application claims the benefit of priority to provisional application Ser. No. 60/399,354 filed on Jul. 29, 2002.

BACKGROUND OF THE INVENTION

The present invention relates to mass transfer and heat exchange columns and, more particularly, to vapor-liquid contact trays used in such columns.

Various types of vapor-liquid contact trays have been developed to facilitate contact between ascending vapor streams and descending liquid streams in mass transfer and heat exchange columns having an upright, cylindrical shape. A plurality of such trays are normally placed in horizontally extending and vertically spaced apart relationship within an open internal region of the column. The trays contain a contacting area or active area having openings that permit vapor to pass upwardly through the tray deck for interaction with liquid flowing across the upper surface of the tray deck. The vapor-liquid interaction that occurs above the active area of the deck forms a froth that facilitates the desired mass transfer and/or heat exchange. Most types of trays also contain larger openings and associated structures referred to as downcomers that allow the liquid to be removed from the tray deck after interaction with the ascending vapor. The liquid is directed downwardly through the downcomer to a normally imperforate liquid receiving or inlet area on the underlying tray.

In vapor-liquid contact trays known as single-pass crossflow trays, the inlet area is typically located at one end of the tray and the liquid then flows across the tray to the opposite end of the tray where it enters a downcomer for passage to the underlying tray. In multiple-pass trays, two or more downcomers are provided on at least some of the trays and the liquid stream is divided into two or more streams that flow across any tray in opposite directions.

One problem with crossflow contact trays of the type described above is the difficulty in ensuring uniform flow of liquid as it travels across the tray from the inlet area to the downcomer. Because the trays are of a circular shape, liquid traveling along the perimeter of the tray travels a greater distance than liquid traveling along the center of the tray. As a result, areas of stagnant flow may develop and reduced liquid-vapor interaction and efficiency may occur.

Vapor-liquid contact trays disclosed in U.S. Pat. No. 3,045,989 to Kittel utilize a center downcomer and an outer annular downcomer on alternate trays. As a result of this downcomer arrangement, liquid flows radially or along a spiral flow path from the center to the perimeter of alternating trays and then from the perimeter to the center of the remaining trays, thereby providing a more uniform flow of liquid and increased efficiency and capacity. While the tray depicted in the Kittel patent represents a significant advance over other types of vapor-liquid contact trays, additional improvements are desirable.

SUMMARY OF THE INVENTION

In one aspect, the invention is directed to a mass transfer column having an external shell defining an open internal region. Return contact trays and centrifugal contact trays are positioned in an alternating and vertically spaced apart relationship within the open internal region. The return contact tray has a tray deck with at least one opening for removing liquid from an upper surface and a plurality of vapor passages for allowing vapor to flow upwardly through the tray deck to interact with liquid on the upper surface of the return tray deck. The centrifugal tray deck has a tray deck with an upper surface, a periphery and a plurality of vapor passages for allowing vapor to flow upwardly through the tray deck to interact with liquid on the upper surface of the centrifugal tray deck. At least one center downcomer extends downwardly at the opening in the return tray deck and has a lower discharge outlet spaced above the centrifugal tray deck for feeding liquid onto the centrifugal tray deck. At least one annular downcomer extends downwardly at the periphery of the centrifugal tray deck and has a lower discharge outlet spaced above the return tray deck for feeding liquid onto the return tray deck. In one embodiment, at least one of the centrifugal contact trays is positioned a greater distance above an adjacent return contact tray than the distance at least one of the return contact trays is positioned above an adjacent centrifugal contact tray. The vapor passages in the tray deck may be valves, louvers, sieve holes, slanted sieve holes or other types of vapor passages. In addition, valve covers may be inclined an angle to the plane of one or both of the centrifugal and return tray decks to shield against liquid entry. In another embodiment, a single support ring supports both a return contact tray and a centrifugal contact tray. In yet another embodiment, one or more baffles are positioned above the return contact tray to impede liquid from jumping over the center downcomer.

In another aspect, the invention is directed to a method of intermixing vapor and liquid streams in a mass transfer column using the vapor-liquid contact trays described above. The invention is also directed to vapor-liquid contact tray units.

BRIEF DESCRIPTION OF THE DRAWINGS

In the accompanying drawings which form part of the specification and are to be read in conjunction therewith and in which like reference numerals are used to indicate like parts in the various views.

DETAILED DESCRIPTION OF THE PREFERRED EMBODIMENTS

Figure 1:
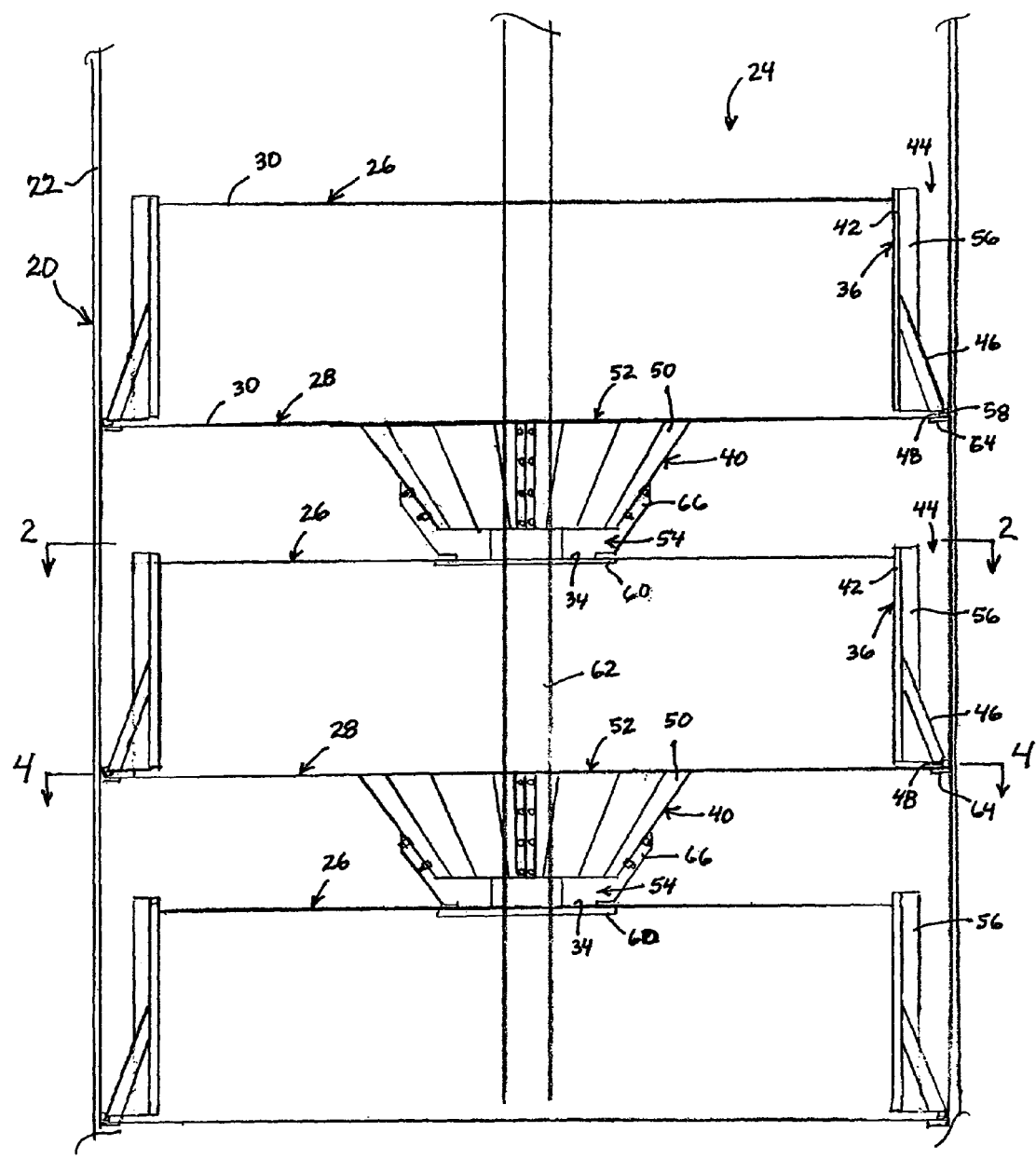
FIG. 1 is a side elevation view of a column taken in vertical section to illustrate contact trays of the present invention positioned within an open internal area of the column.

Referring now to the drawings in greater detail and initially to FIG. 1, a column suitable for use in mass transfer and heat exchange processes is represented generally by the numeral 20. Column 20 includes an upright, external shell 22 that is generally cylindrical in configuration, although other configurations, including polygonal, are possible and are within the scope of the invention. Shell 22 is of any suitable diameter and height and is constructed from one or more suitably rigid materials that are preferably inert to, or otherwise compatible with, the fluids and conditions present within the column 20.

Column 20 is of a type used for processing fluid streams, typically liquid and vapor streams, to obtain fractionation products and/or otherwise to cause mass transfer or heat exchange between the fluid streams. The shell 22 of the column 20 defines an open internal area 24 in which the desired mass transfer and/or heat exchange between the fluid streams occurs. Normally, the fluid streams comprise one or more descending liquid streams and one or more ascending vapor streams. Alternatively, the fluid streams may both be liquid streams or a gas stream and a liquid stream.

The fluid streams can be directed to the column 20 through any suitable number of feed lines positioned at appropriate locations along the height of the column 20. It will also be appreciated that one or more vapor streams can be generated within the column 20 rather than being introduced into the column 20 through one of the feed lines. The column 20 will also typically include an overhead tine for removing a vapor product or byproduct and a bottom stream takeoff line for removing a liquid product or byproduct from the column 20. The various feed and removal lines, as well as other column components that are typically present, such as reflux stream lines, reboilers, condensers, vapor horns and the like, are not illustrated in the drawings because they are conventional in nature and are not believed to be necessary for an understanding of the present invention.

Figure 4:
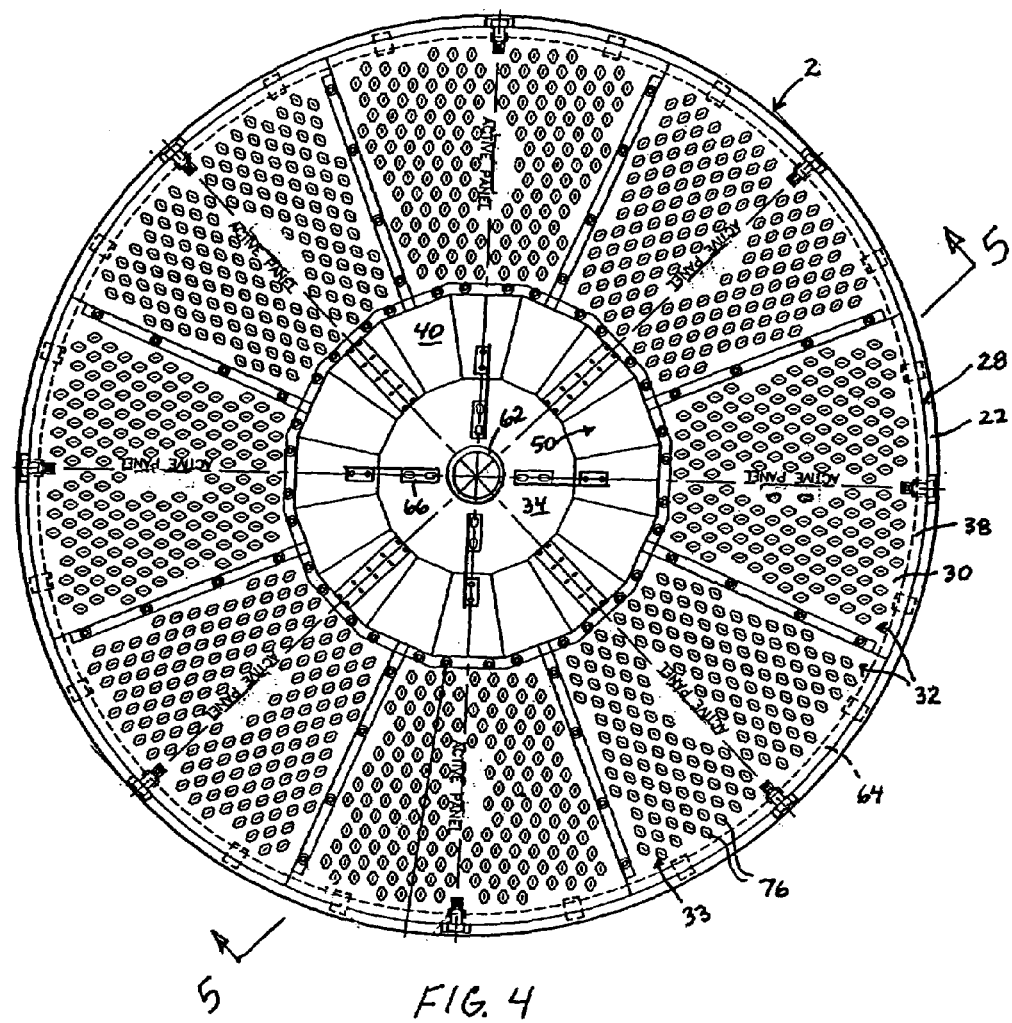
FIG. 4 is top plan view of a return contact tray taken in horizontal section along line 4—4 of FIG. 1.

A plurality of horizontally extending first or centrifugal contact trays 26 and second or return contact trays 28 are positioned in alternating and vertically spaced apart relationship within the open internal region 24 of the column 20. Each tray 26 and 28 includes a horizontally extending tray deck 30 constructed from a plurality of individual panels 32 that are joined together in a suitable fashion. The tray decks 30 for the centrifugal contact trays 26 preferably have a generally circular or, preferably, a polygonal shape, such as the octagonal shape shown in FIG. 2. The tray decks 30 for the return contact trays 28 preferably are generally circular to closely conform to the shape of the column shell 22 as shown in FIG. 4. Each tray deck 30 contains a plurality of vapor passages 33 that allow vapor to pass upwardly through the tray deck 30 for interaction with liquid flowing across the upper surface of the tray deck 30. As discussed in greater detail below, the vapor passages 33 are constructed in a manner to cause the exiting vapor to flow in a preselected direction and thereby push liquid across the tray decks 30 in a desired direction. In the case of the centrifugal contact trays 26, the vapor preferably exits with a tangential flow component to cause the liquid to swirl outwardly from the center to the perimeter of the tray deck 30. In the return contact trays 28, the vapor preferably pushes the liquid radially inward from the perimeter to the center of the tray deck 30.

Figure 2:
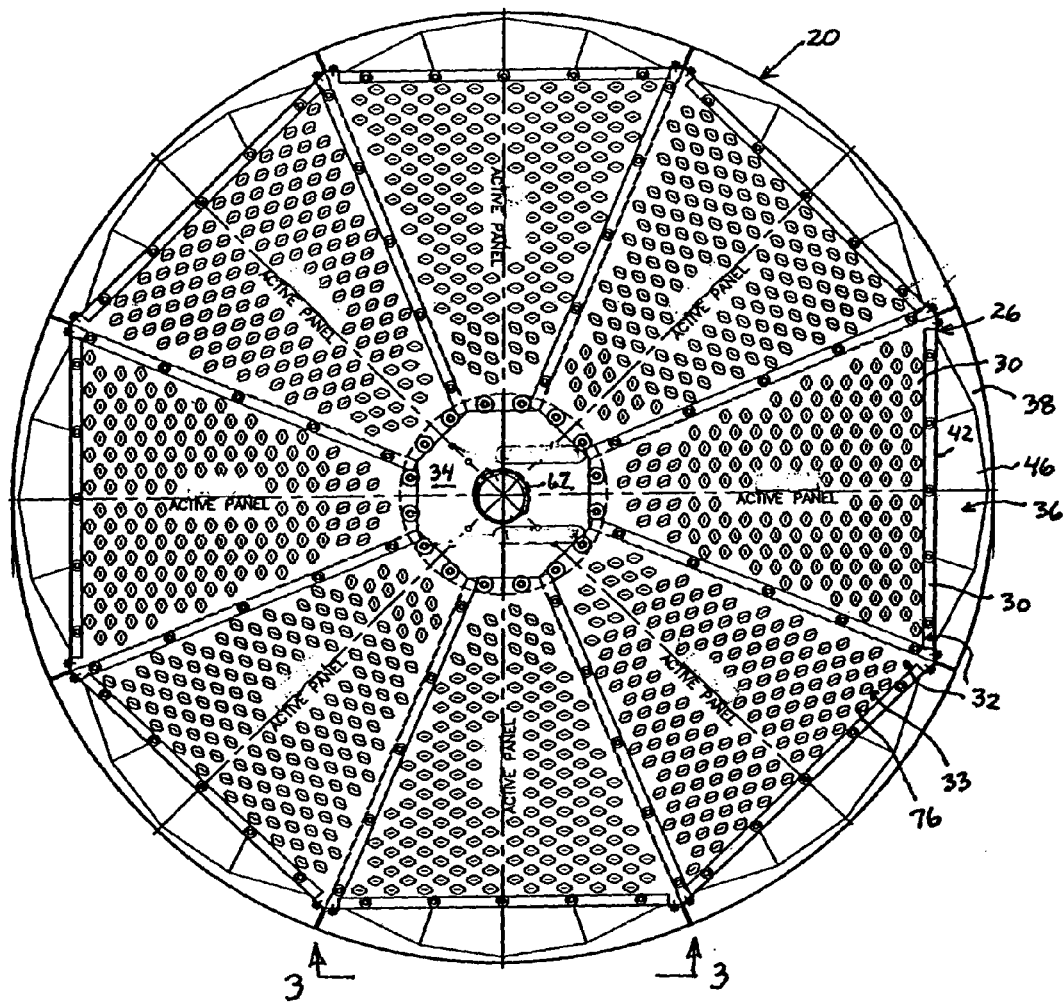
FIG. 2 is a top plan view of a centrifugal contact tray taken in horizontal section along line 2—2 of FIG. 1.
Figure 3:
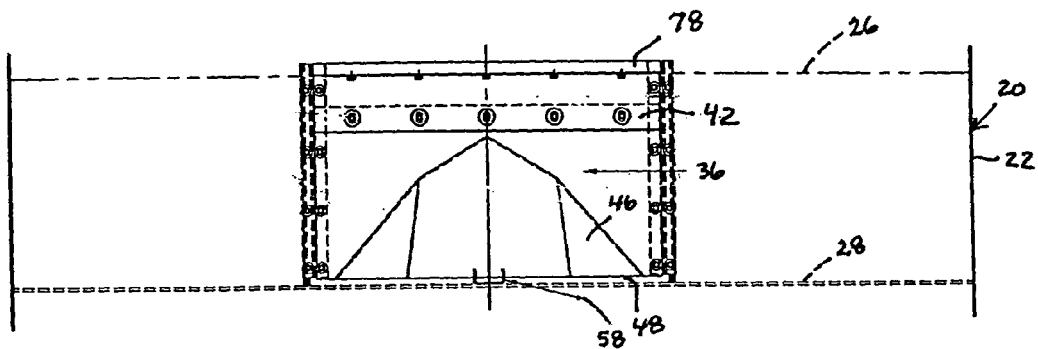
FIG. 3 is a side elevation view of a portion of an annular downcomer on the centrifugal contact tray taken along line 3—3 of FIG. 2.
Figure 5:
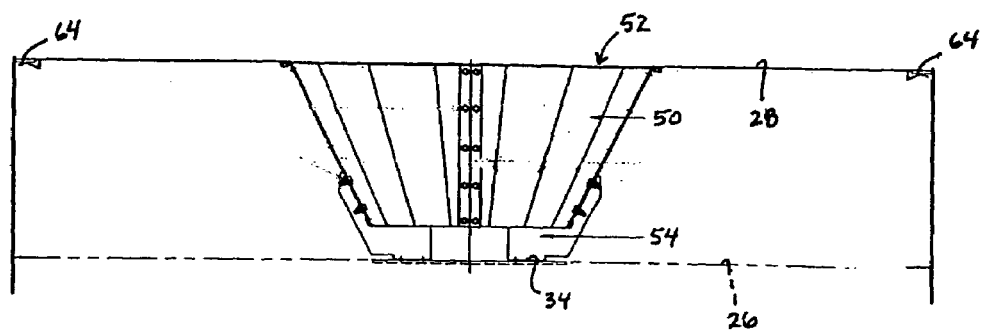
FIG. 5 is a side elevation view of the center downcomer on the return contact tray taken along line 5—5 of FIG. 4.
Figure 6:
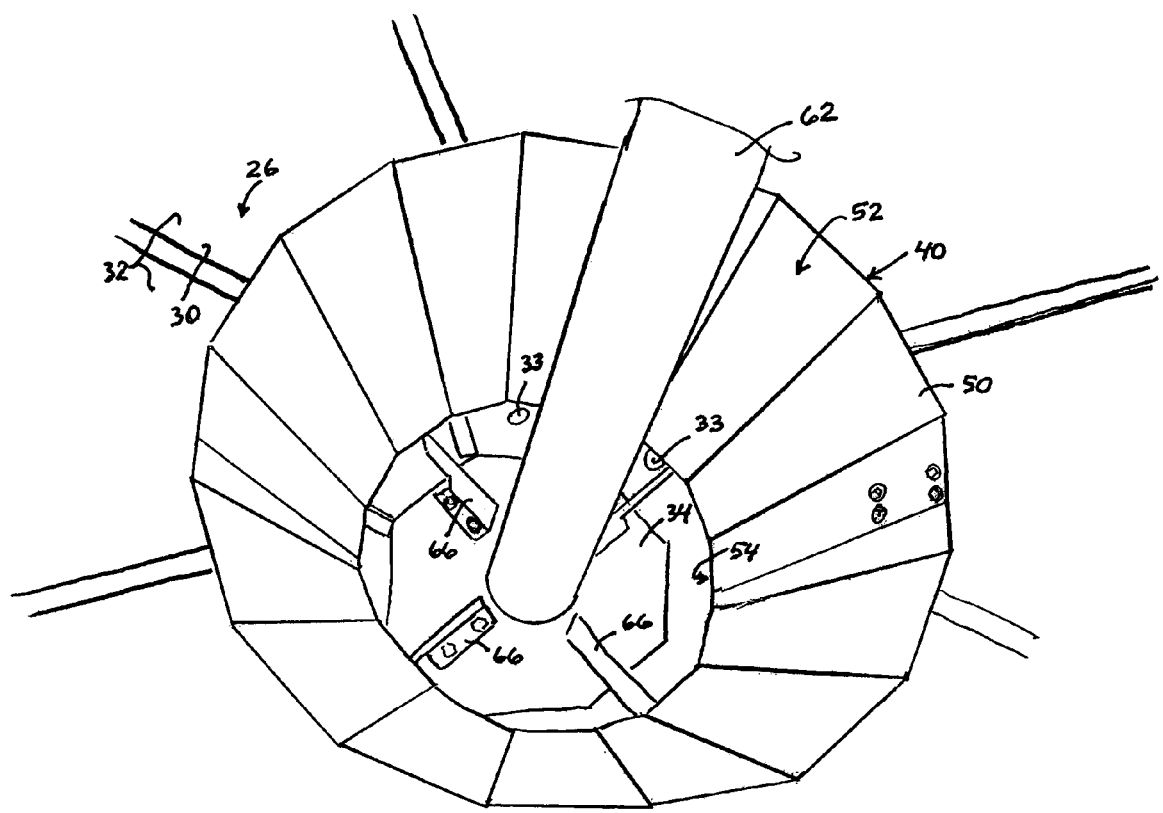
FIG. 6 is a top perspective view of the center downcomer.

As best shown in FIGS. 2, 3 and 6, each centrifugal contact tray 26 has a center circular or polygonal inlet area 34 and an outer, annular downcomer 36 that is formed along the outer perimeter of the tray deck 30. As can be seen in FIGS. 4–5, the return contact trays 28 each have an outer, usually ring-shaped inlet area 38 that underlies the annular downcomer 36 from the overlying centrifugal contact tray 26 and a center downcomer 40 that overlies the inlet area 34 of the underlying centrifugal contact tray 26. As a result of this construction, liquid flows outwardly from the center inlet area 34 of the uppermost centrifugal contact tray 26, crosses the tray deck 30 along a radial or spiral flow path, and enters the annular downcomer 36. The liquid then travels downwardly through the annular downcomer 36, is discharged onto the ring-shaped inlet 38 of the underlying return contact tray 28, and flows radially inwardly along the tray deck 30 to the center downcomer 40. The liquid entering the center downcomer 40 travels downwardly and is discharged onto the center inlet area 34 of the underlying centrifugal contact tray 26. The liquid continues along the flow path described above for each successive pair of contact tray 26 and 28.

The inlet areas 34 and 38 on the contact trays 26 and 28 are preferably imperforate to prevent liquid from weeping through inlet areas 34 and 38 as a result of the downward momentum of the liquid. Other means for preventing or impeding liquid weeping can be utilized in place of or in combination with the imperforate inlet areas 34 and 38. For example, one or both of the inlet areas 34 and 38 can be raised above the plane of the tray deck 30 to allow vapor to flow upwardly through the area of the tray deck 30 underlying the raised inlet areas 34 and 38. Alternatively, one or both of the inlet areas 34 and 38 may be lowered below the plane of the tray deck 30 to form a sump.

Each annular downcomer 36 has a vertically-extending inlet wall 42 that extends downwardly from the outer perimeter of the tray deck 30. The inlet wall 42 may be a single circular wall or it may have a polygonal or multi-segmented shape formed from a plurality of planar or curved sections. In any event, the inlet wall 42 preferably conforms to the shape of the outer perimeter of the tray deck 30 and is spaced inwardly a preselected distance from the column shell 22. The horizontal spacing between the inlet wall 42 and the column shell 22 defines a ring-shaped or multiple-segmented inlet 44 to the downcomer 36.

A lower skirt 46 extends downwardly from a lower edge of the inlet wall 42 and is angled toward the column shell 22, with a lower edge of the skirt 46 being spaced a preselected vertical distance above the plane of the underlying tray deck 30 to define a downcomer outlet 48. The skirt 46 may be a single planar ring or it can be formed from a plurality of continuous or discontinuous segments. In the illustrated embodiment, the skirt 46 is formed from individual segments, each of which bows outwardly toward the column shell 22 such that each segment is closer to the shell 22 at its center portion than its opposed end portions. Other configurations are possible so long as the horizontal spacing between most or all of the lower edge of the skirt 46 and the column shell 22 is less than the horizontal spacing between the inlet wall 42 and the column shell 22. Constructing the skirt 46 in this manner causes less annular area to be available for liquid flow in the lower portions than in the upper portions of the downcomer 36. This constriction in the downcomer 36 facilitates formation of a dynamic liquid seal at the downcomer outlet 48 to prevent vapor entry into the downcomer 36. The relatively wider inlet 44 also allows vapor which has disengaged from the liquid entering the downcomer 36 to escape upwardly rather than being carried through the downcomer 36 where it can interfere with liquid flow. The inclined skirt 46 on the annular downcomer 36 also serves to increase the area available on the underlying return tray for placement of vapor passages 33, thereby increasing the "active area" of the tray deck 30 above which desirable vapor and liquid interaction and froth generation occurs.

In a similar manner, the center downcomer 40 on each return tray 28 has an inlet wall 50 that forms an inlet 52 in the plane of the tray deck 30 and slopes inwardly toward a center axis of the column 20 to define a downwardly narrowing liquid passage. For manufacturing and/or installation efficiency, the inlet wall 50 preferably has an inverted frusto-conical shape formed by multiple flat panels joined end to end and connected along a seam, with a discharge outlet 54 being formed by the preselected vertical spacing between a lower edge of the inlet wall 50 and the underlying tray deck 30. Alternatively, a vertical skirt of cylindrical or other construction may extend downwardly from a lower edge of the inlet wall 50 to form the outlet 54 and/or the inlet 52 may be formed from vertical walls with a sloping wall forming an intermediate or lower portion of the downcomer 40. As with the annular downcomers 36, the construction of the center downcomers 40 is intended to facilitate vapor disengagement and formation of a dynamic liquid seal while increasing the space available for the active area on the underlying tray 26. Other downcomer configurations that accomplish these objectives are possible and are within the scope of the present invention.

Each centrifugal contact tray 26 is supported by a support ring 60 secured to a center support pipe 62 that extends upwardly along the center axis of the column 20 and is supported at its lower end by a beam or by other means. The inlet wall 42 and skirt 46 of each annular downcomer 36 are preferably bolted to bolting bars 56 that are spaced around and welded or otherwise secured to the column shell 22. The downcomer skirt 46 is additionally supported by a plurality of circumferentially spaced apart brackets 58 that are secured to the underlying tray deck 30. In addition to their support function, the brackets 58 serve to position the lower edge of the skirt 46 the desired distances from the tray deck 30 and the column shell 22.

The return trays 28 are each supported by a support ring 64 that is welded or otherwise secured to an inner surface of the column shell 22. Braces 66 are also used to support the center downcomers 40 on the tray deck 30 of the underlying centrifugal trays 26 and to position the downcomer outlet 54 the desired distance above the inlet area 34 on the underlying tray deck 30. Additional support for the trays 26 and 28 can be provided by support beams (not shown) that are either formed integrally with the tray deck panels 32 or are of a separate construction. It can be appreciated that the use of support rings 60 on the support pipe 62, in combination with the various bolting bars 56, brackets 58 and braces 66, allows the use of only a single support ring 64 welded to the column shell 22 to support each pair of trays 26 and 28. Because the support rings 60 on the support pipe 62 have a weldment of much smaller circumference than the weldment of the support ring 64 to the column 22, substantial savings in installation time and expense can be obtained by using only a single support ring 64 attached to the column shell 22 to support each pair of trays 26 and 28.

As can best be seen in FIG. 1, in one embodiment of the present invention, the centrifugal contact trays 26 are positioned a greater distance above the return contact trays 28 than the distance the return contact trays 28 are positioned above the centrifugal contact trays 26. This arrangement of the trays 26 and 28 provides a greater open volume above the return contact trays 28 than above the centrifugal contact trays 26 to accommodate the greater froth height that is present above the return contact trays 28. The froth builds to a greater height above the return contact trays 28 because of the narrowing flow path width as liquid flows radially inwardly from the tray perimeter to the center downcomer 40. The difference in vertical spacing between the trays 26 and 28 can be varied to suit particular applications. For example, rather than using an eighteen inch spacing above and below each tray 26 and 28, the centrifugal contact trays 26 can be spaced twenty-two inches above the return contact trays 28 which, in turn, are spaced fourteen inches above the centrifugal contact trays 26. This use of greater spacing above the return contact trays 28 allows for increases in capacity and efficiency to be obtained without increasing the number of trays 26 and 28 within the column 20 and without increasing the total area within the column that is occupied by the trays.

Figure 7:
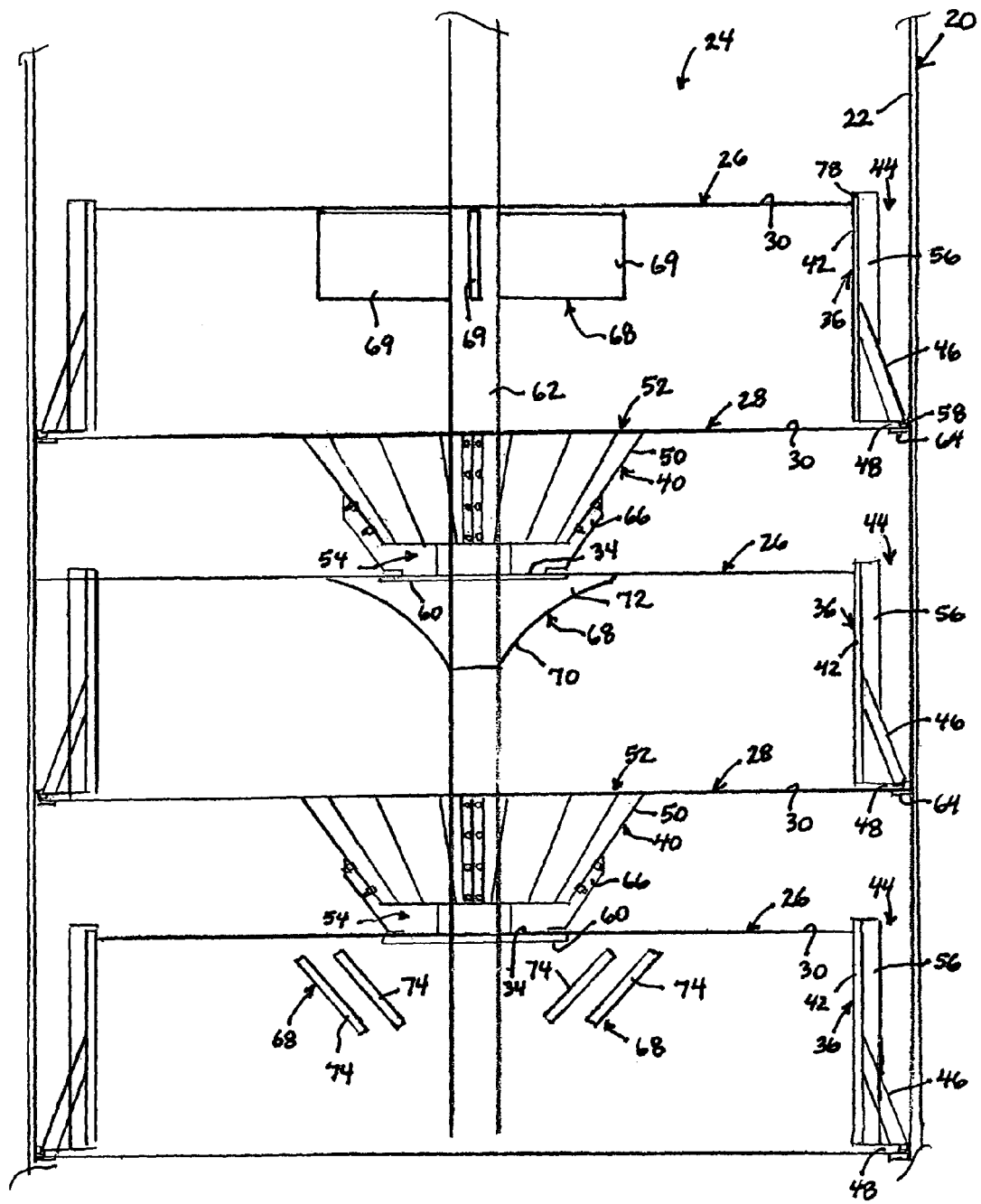
FIG. 7 is a side elevation view of the column taken in vertical section to illustrate various structures.

The efficiency and capacity of the column 20 can also be increased by utilizing various structures above the centrifugal contact trays 26 and/or the return contact trays 28 to facilitate separation of the vapor from the liquid and to assist liquid entry into the downcomers 36 and 40. For example, as illustrated in FIG. 7, one or more baffles 68 are positioned above one or more of the return contact trays 28 to impede or block liquid from jumping over the center downcomer 40 and to provide an impingement surface to facilitate vapor-liquid separation. These baffles 68 can be of various configurations, such as a plurality of vertical plates 69 extending radially from the center support pipe 62 below the uppermost centrifugal contact tray 26 or an inverted cone 70 that has a center opening surrounding the support pipe 62, as shown below the center centrifugal contact tray 26. The cone 70 presents planar or curved deflecting surfaces 72 and is preferably assembled from two or more sections to facilitate installation around the support pipe 62. In an alternative embodiment illustrated below the lowermost centrifugal contact tray 26 in FIG. 7, the baffles 68 are in the form of individual froth collector plates 74 that are angled downwardly in the direction of liquid flow to redirect the liquid from an upward to downward flow. The plates 74 can be permeable to only vapor, both liquid and vapor, or neither liquid or vapor.

The performance of column 20 can also be enhanced by utilizing vapor passages 33 other than those formed by the expanded metal conventionally used in trays of the type disclosed in the aforementioned Kittel patent. For example, as illustrated in FIGS. 2 and 4, the vapor passages 33 can be louvres (not shown) or valves 76 that are either stationary or moveable and are oriented to provide the desired directional push to liquid flowing across the tray deck 30. Thus, the louvres or valves 76 on the centrifugal contact trays are oriented to discharge vapor tangentially or at some other angle to the initial radial flow direction of the liquid exiting the center inlet area 34. This tangential push to the liquid causes it to deviate from a radial to a spiral flow path which provides greater residence time and more complete interaction with vapor on the tray deck 30, as well as facilitating separation of vapor from the liquid and entry of the liquid into the annular downcomer 36. Although the spiral liquid flow path is preferred, a radial or other flow path can be maintained or obtained if desired by appropriate orientation of the louvres or valves 76. Inclined, radially extending blades may also be used in place of or in association with the valves 76 to induce the desired vapor and liquid directional flow. Valves 76 may also be positioned on the return contact trays 28 and are preferably oriented to provide a radially inward push to the liquid.

It will be appreciated that the directional push provided by the louvres or valves 76 in portions of the tray deck 30 may be different than louvres or valves 76 placed in other portions of the tray deck 30. For example, as shown in FIG. 2, the valves 76 placed closest to the inlet area 34 encounter radially flowing liquid and may need to be oriented with a net vapor flow vector closer to radial so that the liquid does not enter and weep downwardly through the valves 76. Those valves 76 placed farther away from the inlet area 34 encounter spirally liquid flow and are oriented with a net tangential vapor flow. Although only two orientations are shown in FIG. 2, additional orientations can be used and may be preferred in certain applications.

Among the types of the valves 76 that can be utilized, alone or in combination, on the tray deck 30 are those stationary valves commonly known as VG0 and VG9 valves and moveable valves commonly known as MV1 and MV9 valves. These types of valves 76 typically utilize a wider upstream leg that impedes liquid entry into the valve. Alternatively or additionally, the valve cover can be inclined at an angle to the plane of the tray deck 30 to shield against liquid entry and to provide a greater directional push to the liquid. If desired, the angle of inclination can be different in different areas of the tray deck 30. Combinations of louvres and valves 76 may be utilized, such as by providing louvres in the areas closest to the inlet area 34 and valves 76 in the remaining areas. Sieve holes, preferably slanted sieve holes, can be also be used alone or in combination with the louvres and valves 76 described above.

In another variation, a rotational motion can be induced in liquid exiting the center downcomer 40 of FIG. 4 by placing a rotation-inducing element within the center downcomer 40 or at its outlet 54. Examples of the rotation-inducing element include a plurality of radially extending guide vanes in the downcomer outlet 54. The guide vanes can be planar or curved, with at least a portion or all of some of the vanes extending at an angle to the vertical.

Weirs 78 may optionally be positioned upstream of the inlets 44 and 52 to the annular and center downcomers 36 and 40, respectively. The weirs 78 may be of different heights, with the weir associated with the annular downcomer 36 preferably being of greater height than any weir associated with the center downcomer 40. Because of the negative hydraulic gradient associated with the liquid flow on the return contact tray 28, it is generally preferred that no weir be utilized with the center downcomer 40.

From the foregoing, it will be seen that this invention is one well adapted to attain all the ends and objectives hereinabove set forth together with other advantages which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A mass transfer column comprising:

an external shell defining an open internal region;

a plurality of return contact trays and centrifugal contact trays positioned in an alternating and vertically spaced apart relationship within the open internal region, wherein each said return contact tray comprises a tray deck having at least one opening for removing liquid from an upper surface of said return tray deck and a plurality of vapor passages for allowing vapor to flow upwardly through said return tray deck to interact with liquid on said upper surface of said return tray deck, wherein each said centrifugal contact tray comprises a tray deck having an upper surface, a periphery and a plurality of vapor passages for allowing vapor to flow upwardly through said centrifugal tray deck to interact with liquid on said upper surface of said centrifugal tray deck;

at least one center downcomer extending downwardly at said opening in said return tray deck, said center downcomer having a lower discharge outlet spaced above said centrifugal contact tray deck for feeding said liquid onto said centrifugal contact tray deck; and at least one annular downcomer extending downwardly at said periphery of said centrifugal contact tray deck and having a lower discharge outlet spaced above said return tray deck for feeding said liquid onto said return tray deck, wherein at least one of said centrifugal contact trays is positioned a greater distance above an adjacent one of said return contact trays than a distance at least one of said return contact trays is positioned above an adjacent one of said centrifugal contact trays.

2. The mass transfer column of claim 1, wherein said vapor passages are valves.

3. The mass transfer column of claim 2, wherein said valves are oriented to provide the desired directional push to the liquid flowing across said tray deck.

4. The mass transfer column of claim 1, wherein said vapor passages are one of louvres and sieve holes.

5. The mass transfer column of claim 1, further comprising:

a rotation-inducing element within said center downcomer to induce a rotational motion in the liquid exiting the center downcomer.

6. The mass transfer column of claim 2, wherein said valves include covers inclined at an angle to the plane of one or both of said centrifugal or return tray deck to shield against liquid entry.

7. The mass transfer column of claim 1, wherein a single support ring supports one pair of contact trays.

8. The mass transfer column of claim 1, further comprising:

one or more baffles positioned above said return contact tray to impede said liquid from jumping over said center downcomer.

9. A vapor-liquid contact tray unit comprising:

a plurality of return contact trays and centrifugal contact trays positioned in an alternating and vertically spaced apart relationship, wherein each said return contact tray comprises a tray deck having at least one opening for removing liquid from an upper surface of said return tray deck and a plurality of vapor passages for allowing vapor to flow upwardly through said return tray deck to interact with liquid on said upper surface of said return tray deck, wherein each said centrifugal contact tray comprises a tray deck having an upper surface, a periphery and a plurality of vapor passages for allowing vapor to flow upwardly through said centrifugal tray deck to interact with liquid on said upper surface of said centrifugal tray deck;

at least one center downcomer extending downwardly at said opening in said return tray deck, said center downcomer having a lower discharge outlet spaced above said centrifugal contact tray deck for feeding said liquid onto said centrifugal contact tray deck; and at least one annular downcomer extending downwardly at said periphery of said centrifugal contact tray deck and having a lower discharge outlet spaced above said return tray deck for feeding said liquid onto said return tray deck, wherein at least one of said centrifugal contact trays is positioned a greater distance above an adjacent one of said return contact trays than a distance at least one of said return contact trays is positioned above an adjacent one of said centrifugal contact trays.

10. The vapor-liquid contact tray unit of claim 9, wherein a single support ring supports one pair of contact trays.

11. The vapor-liquid contact tray unit of claim 10, further comprising:
one or more baffles positioned above said return contact tray to impede said liquid from jumping over said center downcomer.

12. A method of intermixing vapor and liquid streams in a mass transfer column having a plurality of return contact trays and centrifugal contact trays having tray decks with a plurality of vapor passages, at least one center downcomer and at least one annular downcomer, the method comprising:
(a) positioning a plurality of return contact trays and centrifugal contact trays in an alternating and vertically spaced apart relationship wherein at least one of said centrifugal contact trays is positioned a greater distance above an adjacent one of said return contact trays than a distance at least one of said return contact trays is positioned above an adjacent one of said centrifugal contact trays;
(b) directing a liquid stream into an inlet of one or more center downcomers;
(c) discharging substantially all of said liquid stream from said one or more center downcomers onto an underlying centrifugal contact tray deck;
(d) passing a vapor stream upwardly through vapor passages in said centrifugal contact tray, wherein said vapor stream interacts with said liquid stream on the surface of said centrifugal contact tray deck;
(e) flowing said liquid stream across said centrifugal contact tray deck toward a periphery of said centrifugal contact tray deck;
(f) directing at least part of said liquid stream into one or more annular downcomers at said periphery of said centrifugal contact tray;
(g) discharging substantially all of the part of the liquid stream from said one or more annular downcomers onto a return tray deck;
(h) passing a vapor stream upwardly through vapor passages of said return tray deck, wherein said vapor stream interacts with said liquid stream on the surface of said return tray deck;
(i) flowing the liquid stream across said return tray deck toward at least one opening therein; and
(j) repeating steps (a) through (i) on an underlying centrifugal and return contact tray.

13. A mass transfer column comprising an external shell defining an open internal region and a plurality of vapor-liquid contact trays supported in the open internal region, comprising:
an external shell defining an open internal region;
at least one return contact tray and at least one centrifugal contact tray positioned in an alternating and vertically spaced apart relationship within the open internal region;
wherein said return contact tray comprises a tray deck having at least one opening for removing liquid from an upper surface of said return tray deck and a plurality of vapor passages for allowing vapor to flow upwardly through said return tray deck to interact with liquid on said upper surface of said return tray deck, wherein said centrifugal contact tray comprises a tray deck having an upper surface, a periphery and a plurality of vapor passages for allowing vapor to flow upwardly through said centrifugal tray deck to interact with liquid on said upper surface of said centrifugal tray deck;

at least one center downcomer extending downwardly at said opening in said return tray deck, said center downcomer having a lower discharge outlet spaced above said centrifugal contact tray deck for feeding said liquid onto said centrifugal contact tray deck;

at least one annular downcomer extending downwardly at said periphery of said centrifugal contact tray deck and having a lower discharge outlet spaced above said return tray deck for feeding said liquid onto said return tray deck; and one or more baffles positioned above said center downcomer to impede liquid from jumping thereover.

14. A mass transfer column comprising an external shell defining an open internal region and a plurality of vapor-liquid contact trays supported in the open internal region, comprising:
an external shell defining an open internal region;
at least one return contact tray and at least one centrifugal contact tray positioned in an alternating and vertically spaced apart relationship within the open internal region;
wherein said return contact tray comprises a tray deck having at least one opening for removing liquid from an upper surface of said return tray deck and a plurality of vapor passages for allowing vapor to flow upwardly through said return tray deck to interact with liquid on said upper surface of said return tray deck, wherein said centrifugal contact tray comprises a tray deck having an upper surface, a periphery and a plurality of vapor passages for allowing vapor to flow upwardly through said centrifugal tray deck to interact with liquid on said upper surface of said centrifugal tray deck;

at least one center downcomer extending downwardly at said opening in said return tray deck, said center downcomer having a lower discharge outlet spaced above said centrifugal contact tray deck for feeding said liquid onto said centrifugal contact tray deck;

at least one annular downcomer extending downwardly at said periphery of said centrifugal contact tray deck and having a lower discharge outlet spaced above said return tray deck for feeding said liquid onto said return tray deck; and one or more baffles positioned above said return contact tray in vertically spaced relationship to the latter to impede liquid from jumping over said center downcomer, wherein said baffle is a cone.

15. The mass transfer column of claim 13, wherein said baffle comprises curved deflecting surfaces.

16. The mass transfer column of claim 13, wherein said baffle comprises individual froth collector plates.

17. A vapor-liquid contact tray unit comprising:
at least one return contact tray and at least one centrifugal contact tray positioned in an alternating and vertically spaced apart relationship;
wherein said return contact tray comprises a tray deck having at least one opening for removing liquid from an upper surface of said return tray deck and a plurality of vapor passages for allowing vapor to flow upwardly through said return tray deck to interact with liquid on said upper surface of said return tray deck, wherein said centrifugal contact tray comprises a tray deck having an upper surface, a periphery and a plurality of vapor passages for allowing vapor to flow upwardly through said centrifugal tray deck to interact with liquid on said upper surface of said centrifugal tray deck;

at least one center downcomer extending downwardly at said opening in said return tray deck, said center downcomer having a lower discharge outlet spaced above said centrifugal contact tray deck for feeding said liquid onto said centrifugal contact tray deck;

at least one annular downcomer extending downwardly at said periphery of said centrifugal contact tray deck and having a lower discharge outlet spaced above said return tray deck for feeding said liquid onto said return tray deck; and one or more baffles positioned above said center downcomer to impede liquid from jumping thereover.

18. A vapor-liquid contact tray unit comprising:

at least one return contact tray and at least one centrifugal contact tray positioned in an alternating and vertically spaced apart relationship;

wherein said return contact tray comprises a tray deck having at least one opening for removing liquid from an upper surface of said return tray deck and a plurality of vapor passages for allowing vapor to flow upwardly through said return tray deck to interact with liquid on said upper surface of said return tray deck, wherein said centrifugal contact tray comprises a tray deck having an upper surface, a periphery and a plurality of vapor passages for allowing vapor to flow upwardly through said centrifugal tray deck to interact with liquid on said upper surface of said centrifugal tray deck;

at least one center downcomer extending downwardly at said opening in said return tray deck, said center downcomer having a lower discharge outlet spaced above said centrifugal contact tray deck for feeding said liquid onto said centrifugal contact tray deck;

at least one annular downcomer extending downwardly at said periphery of said centrifugal contact tray deck and having a lower discharge outlet spaced above said return tray deck for feeding said liquid onto said return tray deck; and one or more baffles positioned above said return contact tray in vertically spaced relationship to the latter to impede liquid from jumping over said center downcomer, wherein said baffle is a cone.

19. The vapor-liquid contact tray unit of claim 17, wherein said baffle comprises curved deflecting surfaces.

20. The vapor-liquid contact tray unit of claim 17, wherein said baffle comprises individual froth collector plates.

21. A method of intermixing vapor and liquid streams in a mass transfer column having at least one return contact tray and at least one centrifugal contact tray having tray decks with a plurality of vapor passages, at least one annular downcomer and at least one center downcomer, the method comprising:

(a) flowing a liquid stream across a center contact tray toward a periphery of a centrifugal tray deck;

(b) passing a vapor stream upwardly through vapor passages in said centrifugal contact tray, wherein said vapor stream interacts with said liquid stream on the surface of said centrifugal tray deck;

(c) directing at least part of said liquid stream into an inlet of one or more annular downcomers at said periphery of said centrifugal contact tray;

(d) discharging substantially all of the part of said liquid stream from said one or more annular downcomers onto a return tray deck, (e) flowing the liquid stream across said return tray deck toward at least one opening in said return tray deck;

(f) passing a vapor stream upwardly through vapor passages in said return tray deck, wherein said vapor stream interacts with said liquid stream on the surface of said return tray deck, wherein one or more baffles are positioned above said center downcomer to impede liquid from jumping thereover;

(g) directing at least part of said liquid stream into an inlet of one or more center downcomers; and (h) discharging substantially all of the part of the liquid stream from said one or more center downcomers.

22. A mass transfer column comprising an external shell defining an open internal region and a plurality of vapor-liquid contact trays supported in the open internal region, comprising:

an external shell defining an open internal region;

at least one return contact tray and at least one centrifugal contact tray positioned in an alternating and vertically spaced apart relationship within the open internal region;

wherein said return contact tray comprises a tray deck having at least one opening for removing liquid from an upper surface of said return tray deck and a plurality of vapor passages for allowing vapor to flow upwardly through said return tray deck to interact with liquid on said upper surface of said return tray deck, wherein said centrifugal contact tray comprises a tray deck having an upper surface, a periphery and a plurality of vapor passages for allowing vapor to flow upwardly through said centrifugal tray deck to interact with liquid on said upper surface of said centrifugal tray deck;

at least one center downcomer extending downwardly at said opening in said return tray deck, said center downcomer having a lower discharge outlet spaced above said centrifugal contact tray deck for feeding said liquid onto said centrifugal contact tray deck;

at least one annular downcomer extending downwardly at said periphery of said centrifugal contact tray deck and having a lower discharge outlet spaced above said return tray deck for feeding said liquid onto said return tray deck; and one or more conically-shaped baffles positioned above said return contact tray to impede liquid from jumping over said center downcomer.

23. A vapor-liquid contact tray unit comprising:

at least one return contact tray and at least one centrifugal contact tray positioned in an alternating and vertically spaced apart relationship;

wherein said return contact tray comprises a tray deck having at least one opening for removing liquid from an upper surface of said return tray deck and a plurality of vapor passages for allowing vapor to flow upwardly through said return tray deck to interact with liquid on said upper surface of said return tray deck, wherein said centrifugal contact tray comprises a tray deck having an upper surface, a periphery and a plurality of vapor passages for allowing vapor to flow upwardly through said centrifugal tray deck to interact with liquid on said upper surface of said centrifugal tray deck;

at least one center downcomer extending downwardly at said opening in said return tray deck, said center downcomer having a lower discharge outlet spaced above said centrifugal contact tray deck for feeding said liquid onto said centrifugal contact tray deck;

at least one annular downcomer extending downwardly at said periphery of said centrifugal contact tray deck and having a lower discharge outlet spaced above said return tray deck for feeding said liquid onto said return tray deck; and one or more conically-shaped baffles positioned above said return contact tray to impede liquid from jumping over said center downcomer.

* * * * *